United States Patent [19]

Keyser

[11] Patent Number: 5,291,784
[45] Date of Patent: Mar. 8, 1994

[54] FLUID DYNAMIC LINEAR ACCELEROMETER

[75] Inventor: David R. Keyser, Churchville, Pa.

[73] Assignee: The United States of America as represented by the Secretary of the Army, Washington, D.C.

[21] Appl. No.: 63,844

[22] Filed: May 17, 1993

Related U.S. Application Data

[63] Continuation of Ser. No. 919,694, Jul. 24, 1992, abandoned, which is a continuation of Ser. No. 590,873, Sep. 28, 1990, abandoned.

[51] Int. Cl.⁵ ............................................. G01P 15/02
[52] U.S. Cl. ........................... 73/516 LM; 73/515
[58] Field of Search .............. 73/515, 516 R, 516 LM, 73/502

[56] References Cited

U.S. PATENT DOCUMENTS

| | | | |
|---|---|---|---|
| 2,776,829 | 1/1957 | Cockram | 73/515 |
| 2,942,474 | 6/1960 | Statham | 73/516 LM |
| 3,008,334 | 11/1961 | Lees | 73/516 LM |
| 3,433,080 | 3/1969 | Larson | 73/515 |
| 3,517,559 | 6/1970 | Blazek | 73/515 |
| 3,961,536 | 6/1976 | Ringwall | 73/515 |
| 4,165,503 | 8/1979 | Holmes et al. | 73/516 R |
| 4,395,908 | 8/1983 | Shopland | 73/516 LM |

Primary Examiner—John E. Chapman
Attorney, Agent, or Firm—James V. Tura; James B. Bechtel; Susan E. Verona

[57] ABSTRACT

A linear acceleration sensing device operates through a fluid medium. A fluid signal output represents a differential pressure from the elastic deformation of a fluid-filled diaphragm or bellows assembly. A pair of fluid proximity sensors operate differentially in a fluid control network and detect the elastic deformation of the diaphragm assembly caused by increased hydrostatic pressure resulting from a change in acceleration, or "g" force.

5 Claims, 2 Drawing Sheets

DIFFERENTIAL PRESSURE SENSING DEVICE

FLUID DYNAMIC LINEAR ACCELEROMETER

STATEMENT OF GOVERNMENT INTEREST

The invention described herein may be manufactured and used by or for the Government of the United States of America for governmental purposes without the payment of any royalties thereon or therefore.

This is a continuation of co-pending application Ser. No. 07/919,694 filed on Jul. 24, 1992 now abandoned which is a continuation of application Ser. No. 07/590,873 filed Sep. 28, 1990, now abandoned.

BACKGROUND OF THE INVENTION

Advanced high-performance aircraft use angular rate and linear acceleration sensing for vehicle motion feedback in their flight control systems. These aircraft require either a Command Augmentation System (CAS) or a Stability Augmentation System (SAS) design for their primary flight control because their aerodynamic response to maneuvering commands is faster than the pilot is able to control. For example, the McDonnell Douglas F/A-18 Hornet is the first operational, high-performance tactical aircraft to use a digital fly-by-wire (FBW) primary flight control system where the flight control laws are programmed into digital computers. These computers are flight-critical and must be installed with sufficient redundancy for flight safety and mission requirements. Currently, high-performance tactical aircraft (as well as most commercial transport aircraft now in service) use hydromechanical flight controls with additional, limited-authority, electrically-powered stability augmentation systems (SAS). In this type of design, the pilot would have full control over the servovalve on the actuator and therefore also over the control surface. He can also use or disengage the SAS as desired and because the SAS is limited in authority, he can override its surface command in the event of failure. In many of these prior systems, the early, mechanical accelerometer used was the Kollsman pendulum (open-loop) design. In this device, the sensitive mass deflects two symmetric pendulae under load on their lever arms, and this motion is transferred by sector gears to a pointer on the dial face which indicates the current normal "g" load on the airframe. This device is a moment balance sensor with a pair of ratcheting indicators (pointers) which remain at the maximum and minimum (negative) reading sensed.

Advances have been made in the field of accelerometers and in one class of known electro-mechanical accelerometers, the sensitive mass is returned to its initial position (at zero or one "g") by a servo control drive. A measure of the force, such as the electrical current, required to drive the mass back to its initial setpoint transduces the measured acceleration to an electrical output. Other forms of electrical output devices, such as seismic or piezoelectric accelerometers, make accurate dynamic measurements of vibration and shock motions throughout the range of fractions of a "g" to thousands of "g's". In these solid state instruments, a relatively thin supporting member is attached to the sensitive mass, and the strain in this "spring" is transduced as the acceleration signal.

To satisfactorily perform the backup function to a primary FBW flight control system, the backup system should be technologically dissimilar (i.e. nonelectric) to eliminate such common mode failures as loss of electric power, generic computer faults, and various forms of electromagnetic interference. Research has shown that fluidics can protect these systems by providing a functionally redundant, nonelectric, stability augmentation control mode. For an integrated flight control system which has a fluidic reversion mode and in which the fluidic sensors are shared with the FBW primary system, the advantages can include lower levels of redundancy for the electronic controls, lower maintainance costs, less weight and improved survivability. Because the fluidic system is tracking the FBW system, any transient effects of reversion to the backup system can be minimized. Additionally, the signals from the fluidic sensors can be transduced to electrical outputs and also used by the primary system.

SUMMARY OF THE INVENTION

It is therefore an object of the present invention to provide a fluid dynamic linear accelerometer.

It is a further object of the present invention to provide said fluid linear accelerometer that does not depend on the presence or absence of electricity.

It is a still further object of the present invention to provide a fluid linear accelerometer that does not require mechanically moving parts.

It is a still further object of the present invention to provide a fluid linear accelerometer utilized in backup fluidic flight controls used in advanced tactical aircraft.

These objects and advantages of the present invention are achieved by a fluid dynamic linear accelerometer that has a fluid-filled cylinder with oppositely-disposed flexible thin metal diaphragm ends. A pressurized liquid or gas chamber may surround each diaphragm end, and at least one matched pair of proportional proximity sensors are positioned, one adjacent to each diaphragm, to detect deflections thereof due to acceleration. Additionally, each proximity sensor is connected through fluid connections into a fluid flow resisting network which produces a differential pressure, compatible with fluid control circuits. This flow resisting network, which serves to linearize the essentially nonlinear differential pressure, from the pair of proximity sensors, has two similar branches supplied from the same regulated fluid supply. When a diaphragm moves towards or away from a proximity sensor, the flow in the associated branch is altered. As an alternate embodiment, an electro-formed thin metal bellows, such as an instrument-grade bellows, may be substituted for the pair of thin metal diaphragm ends.

DETAILED DESCRIPTION OF THE PREFERRED EMBODIMENT

Figure 1:
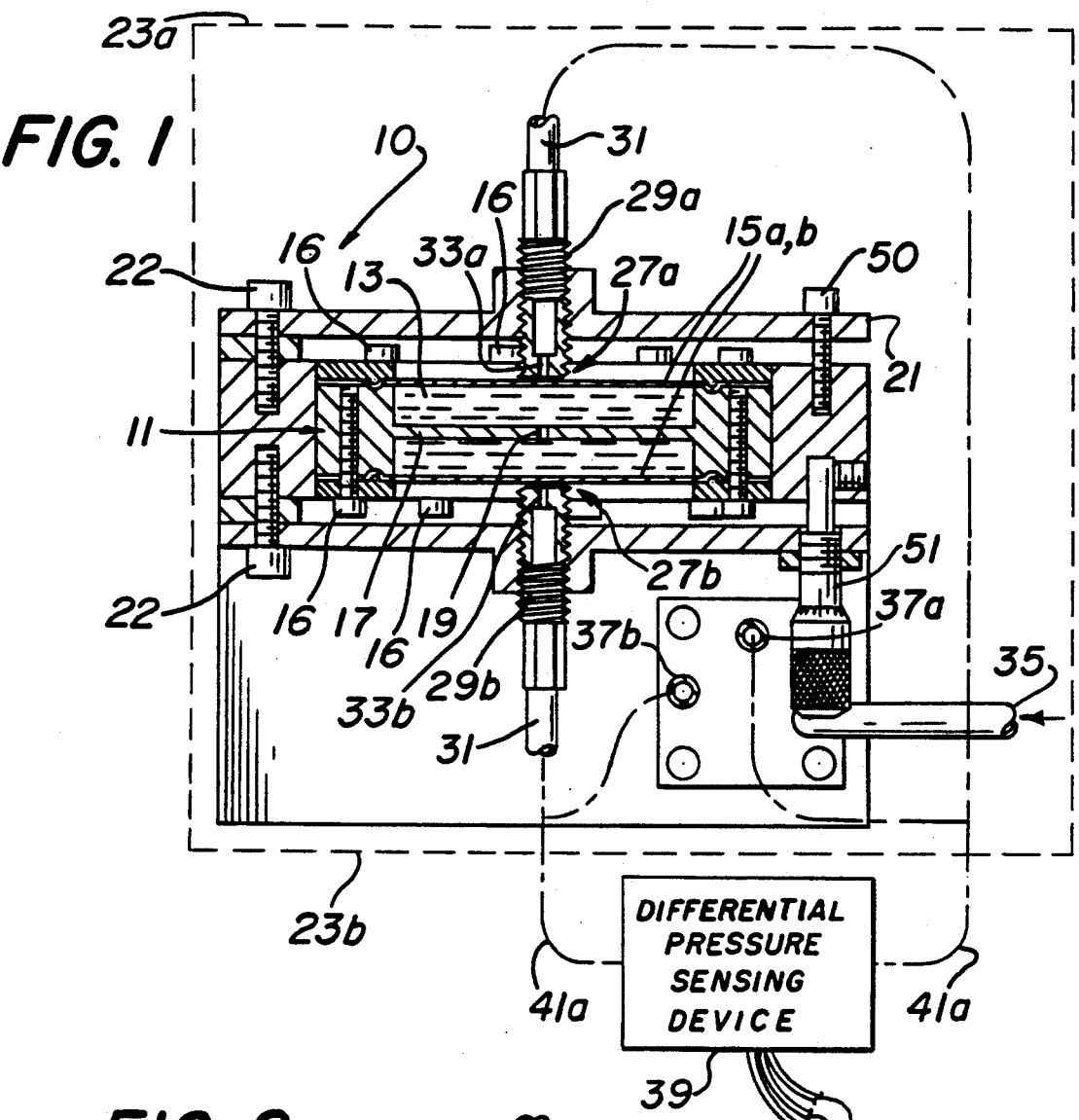
FIG. 1 shows a cross-sectional view of an air to liquid fluid dynamic linear accelerometer connected to a fluidic control circuit.

A fluid dynamic linear acceleration device 10, shown in cross-section in FIG. 1, provides a differential pressure output compatible with fluid control circuits. The device 10 operates at a relatively low pressure, and at a wide range of accelerations. The output of the device is reasonably linear between for example, −8g and +8g (where 1g is the acceleration of gravity at sea level). The effects of temperature, altitude and structural vibration are minimized.

The device 10, includes open-ended cylinder 11 filled with a viscous fluid, such as oil 13. Cylinder 11 is rigidly attached to a mounting framework 20, such as by mounting bolts 22, and which framework 20, in turn, is rigidly attached to framework 21. The specific gravity and viscous characteristics of this oil 13 are chosen to adjust the performance characteristics of the device 10.

Respective flexible diaphragms 15a, 15b are stretched across each end of cylinder 11 and clamped thereto by bolts 16. An adjustable damping device 17 extends parallel to the two diaphragm ends 15a, 15b and across the center of the interior of the cylinder 11 to divide that cylinder 11 into two equal chambers or halves. This damping device 17 contains an adjustable metering port 19 which connects the two chambers of cylinder 11.

Figure 3:
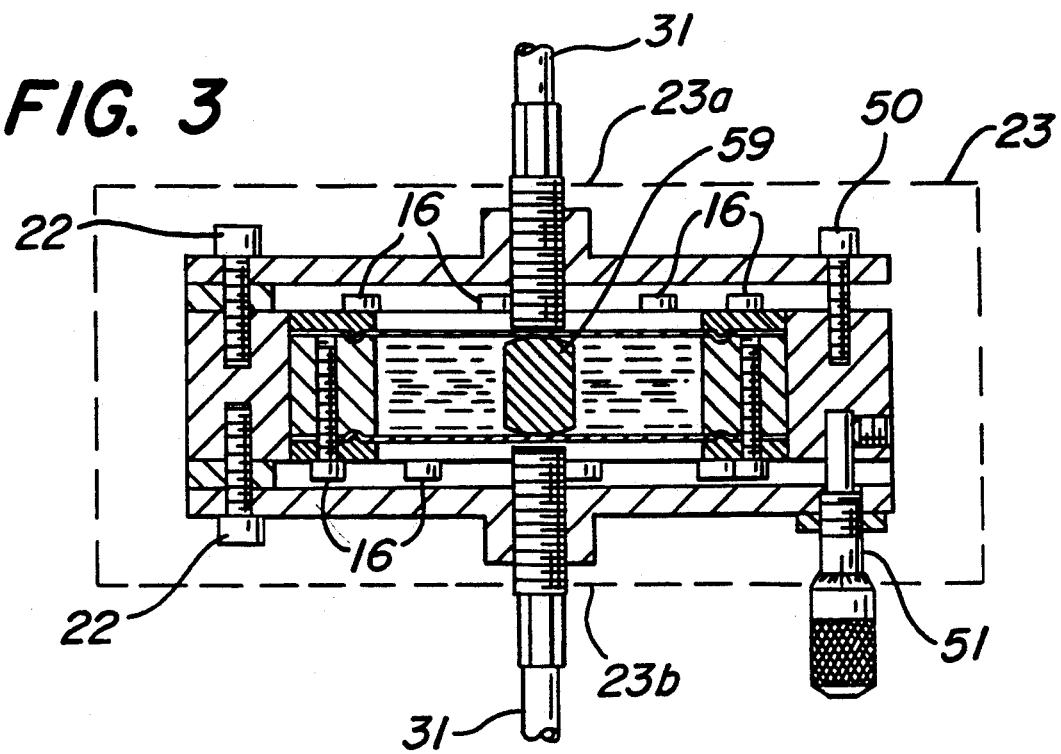
FIG. 3 shows a cross-sectional view of another alternate embodiment, with the flow impedance network removed for simplification, showing a solid mass in a liquid to liquid fluid dynamic linear accelerometer.

Mounting framework 21 carries two proximity sensors and is used to set the position (gap) of the proximity sensors. Framework 21 surrounds cylinder 11 in both air-to-liquid systems (shown in FIG. 1) and liquid to liquid systems, such as are shown in FIG. 3. In FIG. 3, an alternate embodiment, housing chamber 23 contains a liquid or gas less dense in cylinder 11 so that the fluid inside is more dense than the fluid outside.

The two matched proximity sensors 27a, 27b are positioned to extend through opposite walls of framework 21 so that each of the sensors 27a, 27b is adjacent a respective cylinder diaphragm 15a, 15b. Each sensor 27a, 27b has a housing member 29 and a fluid pipe connection 31 thereto. Each sensor housing member 29 carries a respective through-hole or metered orifice 33a, 33b. These metered orifices 33a, 33b connect the tubing) connection 31.

Pressure supply 35 provides a regulated flow of fluid into two separate and similar flow resisting network branches 37a, 37b. Each branch 37a, 37b of the flow resisting network terminates as an input to a differential pressure sensor device 39 (see also FIG. 4). This differential pressure sensor device 39 provides an 41a signal 41a which may be used directly with fluid control systems or the output may be transduced, such as at 41b, to be used with other systems, such as known fly-by-wire systems.

Each proximity sensor 27a, 27b has its respective pipe (or tubing) connection 31 connected into the pipe (or tubing) comprising a respective one of the branches 37a, 37b of the flow resisting network.

Figure 4:
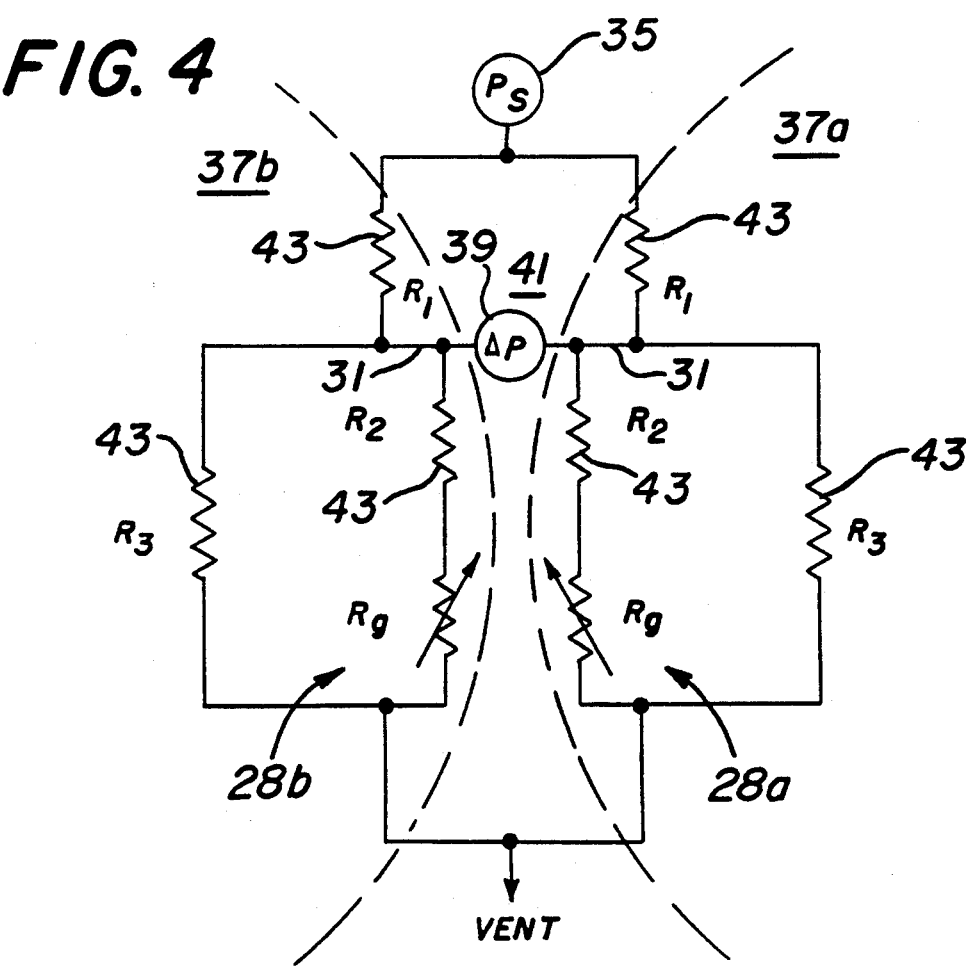
FIG. 4 shows a schematic diagram of the flow impedance circuit.

As shown in FIG. 4, a plurality of flow resisting elements 43 are connected into each network branch 37a, 37b. There is, from each network branch 37a, 37b a connection between, the sensor pipe connection 31 and the respective network branch 37a, 37b. Additionally, there is one such connection in each portion of the network branch 37a, 37b extending between the regulated pressure supply 35 and the sensor 27a, 27b connection and there is one such connection from each portion of the network branch 37a, 37b extending between the sensor 27a, 27b connection and the differential pressure sensor 39.

Figure 2:
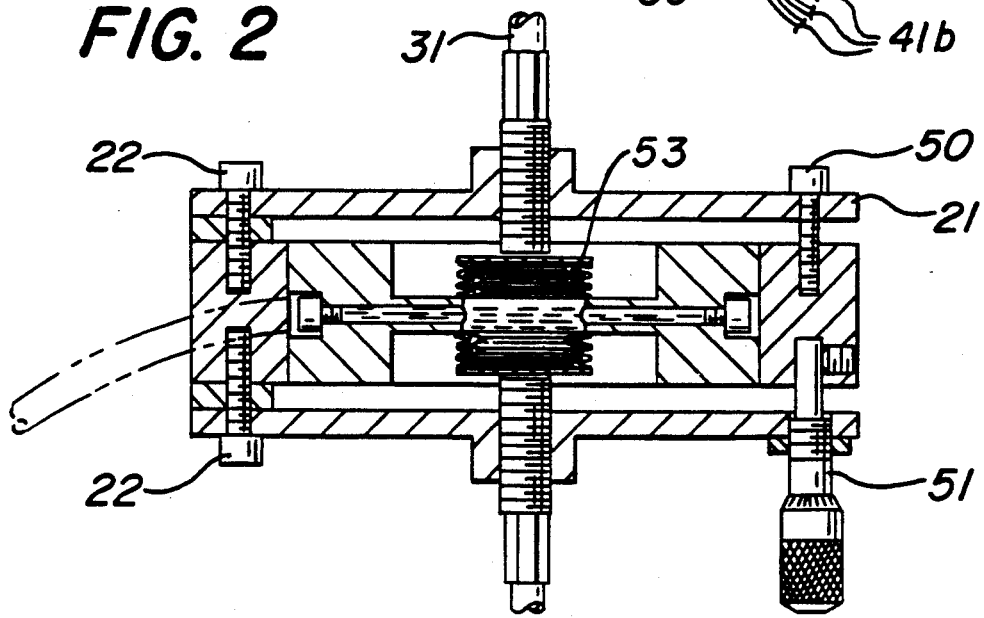
FIG. 2 shows a cross-sectional view of an alternate embodiment of an air to liquid fluid dynamic linear accelerometer, with the flow impedance network removed for simplification, substituting a bellows assembly for the diaphragm assembly.

The fundamental "g" force sensing element is the filled cylinder 11 having flexible diaphragm ends 15a, 15b on the sensitive axis. Both diaphragms 15a, 15b deflect under load. The device approaches the design implementation of a spring mass and damper system, except in this case there is no relative mechanical motion nor concurrent frictional forces only elastic deflection of the diaphragms 15a, 15b. In FIG. 1, liquid 13 functions as the mass. Under increasing "g" force loads, the hydrostatic pressure on the lower diaphragm 15b increases and it deflects. By conservation of mass, the liquid 13 motion creates a suction pressure on the top diaphragm 15a causing it to deflect with load, also. By suitably designing the interior geometry of the cylinder 11 with orifices 19 and other flow impeding structures 17, a wide range of damping coefficients may be obtained. This is used to reduce or eliminate the sensitivity of the device 10 to vibrations. In FIG. 2, bellows 53 acts as the g-sensitive means, and in FIG. 3 the solid 59 and fluid 60 filled cylinder 11 is the g-sensitive means.

Each fluid dynamic proximity sensor 27a, 27b issues a jet of fluid into the chamber 23 through its small orifice 33a, 33b into the network branch which impacts upon the surface of the diaphragm 15a, 15b. As the surface of a diaphragm 15a, 15b is brought closer to the proximity sensor orifice 33a, 33b, the static pressure in the network branch conduit 37a and 37b is increased because the flow available to the orifice 33a, 33b is impeded. A typical pressure and flow versus displacement curve is highly nonlinear. This allows the sensitivity of the device 10 to be calibrated in respect to diaphragm displacement about some mean (gap) position, i.e. the initial distance between a diaphragm 15a, 15b and its sensor 27a, 27b when the vehicle or aircraft in which the accelerometer is mounted is at rest. The adjustment involves selecting the mean gap (distance) between the sensor orifice 33a, 33b and the diaphragm surface. This may be accomplished by adjusting set screws 50,51 on framework 21 and the threaded portion of 29a&b.

Each flow resisting circuit, including 37 and 28, is a balanced, flow division network as shown in the schematic diagram in FIG. 4. The diagram shows an hydraulic bridge arrangement in which $R_3$ is the input impedance to the control ports of the fluid control amplifier immediately downstream. $R_g$ 28 is the variable proximity resistance which is subject to the designer's choice of the initial gap. As $R_g$ 28 in one branch increases, the resistance of $R_g$ in the other branch decreases. $R_1$ and $R_2$ are fixed impedances selected by design, such as the values 218,000 lb sec/ft.$^5$ and 25,000 lb sec/ft.$^5$. Under a "no load" condition, i.e. no acceleration, the flow impedances on both branches 37a plus 28a, 37b plus 28b of network are equal, and the differential output signal 41 is zero. Under load, one diaphragm 15a or 15b moves closer to its proximity sensor 27a or 27b, thereby increasing the impedance, $R_g$28a or 28b in that network branch 37a or 37b, while the other diaphragm moves away from the other proximity sensor, decreasing the flow resistance in the other branch. This motion unbalances the flow network and causes a differential pressure at the output 41. The values of the impedances in this network can be varied to produce signal shaping of the output differential pressure signal 41 as a function of linear acceleration.

Construction of the device 10 can be had of many different and suitable materials. Typically cylinder 11 is constructed of aluminum alloy or suitable plastic or metal substitute. The diaphragms 15a, 15b are of a flexible metal such as stainless steel, in a thickness range of from 0.0005 inches to 0.015 inches. Other flexible materials may be substituted for this flexible metal diaphragm material. A flexible instrument grade bellows 53 can be substituted for the diaphragms as is shown in FIG. 2. When this alternate embodiment is used, the convoluted bellows can be made by machining an appropriately sized mandrel, electroplating nickel onto the mandrel to the desired thickness, and then removing the mandrel chemically.

In the preferred embodiment, cylinder 11 is from 1.0 inches in diameter to 5.0 inches in diameter. It can be from 0.5 inches long (high) to 6.0 inches long (high). By varying the size of this cylinder, the sensitive mass of liquid is adjusted.

The operation of the device 10 can be further affected by the size of the damping metering port 19, which can be varied from 0.010 inches to 0.100 inches in diameter, and the size of the sensor orifice 33a, 33b, which can be between 0.001 inches and 0.100 inches. In a preferred embodiment, the sensitive mass volume, i.e. cylinder 11 is 0.7 inches high by 2.25 inches in diameter. The diaphragm thickness is 0.008 inches. The proximity sensor ID and OD are 0.052 and 0.307 inches, respectively. The initial gap between a diaphragm and the closest face of the proximity sensor is set at 0.010 inches. The diaphragm material is stainless steel in which the maximum stress increment due to load is 280 psig. The balanced upstream flow impedance is selected to be 218000 lb sec/ft.$^5$ which value corresponds to a 6R035 fluidic nozzle.

The present invention provides acceleration sensing which does not depend in any way on the presence or absence of electricity and minimizes mechanical moving parts. Its differential pressure output is compatible with fluid control circuits or can be transduced to electrical signals for use with existing electronic control systems. A relatively low pressure, for example between 2 and 25 Torr in air is used. It can be designed to fit any acceleration range of interest. Further, it is possible to incorporate fluid compensation circuits to linearize the sensor output. A major long-term advantage of this device 10 is its simplicity and reliability.

For the aircraft applications, device 10 is designed to minimize the effects of temperature and altitude on its output. While all airframe sensors are subjected to structural vibrations, a provision for adjustable vibration damping has been made in the present design. The invention is easy to use and has quite satisfactorily repeatable operation even over long periods.

Obviously other embodiments and modifications of the present invention will readily come to those of ordinary skill in the art having the benefit of the teachings presented in the foregoing description and drawings. It is therefore to be understood that various changes in the details, materials, steps and arrangements of parts, which have been described and illustrated to explain the nature of the invention, may be made by those skilled in the art within the principle and scope of the invention as expressed in the appended claims.

What I claim is:

1. A fluid operated accelerometer for sensing linear acceleration, comprising:
   a fluid network being connected to a regulated fluid supply having a pair of similar fluid branches, each said fluid branch containing at least one fixed fluid resistance and at least one variable proximity resistance, said resistances comprising first and second position sensing means, respectively;
   a differential pressure sensor connected between said pair of fluid branches for measuring the fluid pressure differences provided therebetween;
   an acceleration sensitive means, having a container positioned thereabout, wherein said acceleration sensitive means comprises a bellows assembly containing a liquid mass; and
   wherein said first and second variable proximity resistances are positioned adjacent one each to a respective opposite side of said bellows assembly for sensing the relative movement thereof.

2. A fluid-operated accelerometer for sensing linear acceleration, comprising:
   a fluid network being connected to a regulated fluid supply having a pair of similar fluid branches, each said fluid branch containing at least one fixed fluid resistance means and at least one variable proximity resistance means, said variable proximity resistance means comprising first and second position sensing elements, respectively;
   a differential pressure sensor connected between said pair of fluid branches for measuring the fluid pressure differences provided therebetween;
   an acceleration-sensitive means, having a container positioned thereabout, wherein said acceleration sensitive means comprises a bellows assembly containing a liquid mass; and
   wherein said first and second position sensing elements are positioned adjacent one each to a respective opposite side of said bellows assembly for sensing the relative movement thereof.

3. A fluid operated accelerometer for sensing linear acceleration comprising:
   an acceleration sensitive element consisting of a flexible bellows assembly containing a liquid mass and having a pair of opposing ends movable by movement of said liquid mass;
   first and second position sensing elements, one each being positioned adjacent a respective one of said bellows assembly movable ends for sensing the movement in a said respective movable end created upon the movement of said liquid mass;
   regulated fluid supply means; and
   fluid flow impedance network means, comprising first and second branches connected to said regulated fluid supply means and to said first and second position sensing elements, respectively, which produces a differential pressure between said fluid branches as a function of the operation of said first and second position sensing elements.

4. An accelerometer connected to a regulated fluid supply, comprising:
   a housing chamber;
   a first fluid within said housing chamber;
   an acceleration sensitive means comprising a bellows assembly containing a second fluid, said bellows assembly being positioned within said housing chamber and surrounded by said first fluid;
   a fluid network connected to said regulated fluid supply and having a first fluid branch containing a first variable proximity resistance element and a second fluid branch containing a second variable proximity resistance element;
   a differential pressure sensor connected to said first and second fluid branches for measuring the fluid pressure differences therebetween and for providing an output signal; and wherein said first and second variable proximity resistance elements operate as position sensing means one each of which is positioned adjacent a respective opposite side of said bellows assembly for sensing the relative movement thereof.

5. A fluid-operated accelerometer being connected to a regulated supply of a first fluid, comprising:
  a chamber;
  an acceleration-sensitive means positioned within said chamber, said acceleration sensitive means having a first and a second opposedly positioned axial end each enclosed with an individual respective fluid deformable diaphragm;
  a second more-dense fluid contained within said acceleration-sensitive means and in contact with said first and second end diaphragms and causing said diaphragms to deform in response to acceleration;
  a fluid network connected to said fluid supply and to said chamber and containing first and second position-sensing elements, one each being positioned adjacent a respective one of said first and second end diaphragms for sensing the differential change in positions thereof;
  a differential pressure sensor connected to said fluid network for providing an output as a function of the difference in movement of said first and second diaphragms; and
  wherein said fluid from said regulated fluid supply passes through said first and second position-sensing elements into said chamber.

* * * * *

UNITED STATES PATENT AND TRADEMARK OFFICE
CERTIFICATE OF CORRECTION

PATENT NO. : 5,291,784
DATED : 03/08/94
INVENTOR(S) : David R. Keyser

It is certified that error appears in the above—identified patent and that said Letters Patent is hereby corrected as shown below:

On the Title page, item #73 - Assignee. This block should read:

"The United States of America as represented by the Secretary of the Navy, Washington, D. C."

Signed and Sealed this

Thirtieth Day of August, 1994

Attest:

BRUCE LEHMAN

Attesting Officer   Commissioner of Patents and Trademarks